Dec. 15, 1970  D. J. BOOTY ETAL  3,546,874
PENDULUM CLOCK

Filed Nov. 6, 1968

INVENTORS
Donald J. Booty
Christian M. Jauch
Charles F. VanderVelde
Jack C. Waage
BY Merriam, Marshall, Shapiro & Klose
ATTORNEYS Dec. 15, 1970    D. J. BOOTY ET AL    3,546,874
PENDULUM CLOCK Filed Nov. 6, 1968    2 Sheets-Sheet 2

INVENTORS
Donald J. Booty
Christian M. Jauch
Charles F. VanderVelde
Jack C. Waage
BY Merriam, Marshall, Shapiro & Klose
ATTORNEYS United States Patent Office 3,546,874
Patented Dec. 15, 1970

3,546,874
PENDULUM CLOCK
Donald J. Booty, Oak Forest, Ill., Christian M. Jauch, Louisville, Miss., Charles F. Vander Velde, Oak Forest, Ill., and Jack C. Waage, Louisville, Miss., assignors to Spartus Corporation, Chicago, Ill., a corporation of Illinois
Filed Nov. 6, 1968, Ser. No. 773,804
Int. Cl. G04b 17/02
U.S. Cl. 58—129         10 Claims

ABSTRACT OF THE DISCLOSURE

A pendulum clock having a simulated pendulum displayed upon an opaque plate attached to the pendulum of the clock mechanism. The pendulum of the clock mechanism is hidden from view. The simulated pendulum is visible and has a size, shape and location independent of, and an angular oscillation similar to, the pendulum of the clock mechanism.

BACKGROUND OF THE INVENTION

This invention relates generally to pendulum clocks and, more particularly, to a pendulum clock in which the pendulum of the clock mechanism is disproportionately large in relation to the visible external parts on the front of the pendulum clock.

Conventional pendulum clocks typically comprise a clock mechanism having a pendulum located behind a front plate having a transparent opening through which the pendulum may be observed. The term "transparent opening" is used herein to indicate either an uncovered physical opening or a transparent window. The clock mechanism may have either a regulating or nonregulating pendulum. The size, shape and location of the pendulum is fixed for a given clock mechanism; and, when this pendulum is visible, it imposes limitations on the size, shape and location of the external, visible parts of the clock front.

These limitations cause problems when one desires the external, visible parts of the clock front to be small. Small external, visible parts on the clock front require a correspondingly small visible pendulum having a size, shape and location appropriate to the size of the other visible parts. In the case of conventional pendulum clocks, this requires the use of a clock mechanism having a suitably small pendulum. Such a clock mechanism is often expensive or difficult to obtain. This is particularly true of a clock mechanism having a regulating pendulum, because the period of oscillation of such a pendulum is dependent upon its length.

SUMMARY OF THE INVENTION

All of the aforementioned problems of conventional pendulum clocks are eliminated by embodiments of pendulum clocks in accordance with the present invention which permits the use of external, visible parts on the clock front having a size, shape and location independent of the size, shape and location of the pendulum of the clock mechanism. In other words, the pendulum clock may employ a clock mechanism having a pendulum disproportionately large in relation to the visible, external parts of the pendulum clock.

Such a pendulum clock comprises a front plate upon which are displayed visible, external clock front parts. Located behind the front plate is a clock mechanism having a first pendulum. The front plate includes a transparent opening, and located between the transparent opening and the first pendulum is an opaque plate mounted to swing with the first pendulum.

Only the opaque plate is visible through the transparent opening, at least a substantial part of the first pendulum being shielded from view by the opaque plate. The front plate is of a size sufficient to hide from view that part of the first pendulum not hidden by the opaque plate.

Displayed on the opaque plate is a simulated pendulum having a size and shape appropriate to the size and shape of the visible, external clock parts on the front plate.

The opaque plate may be spaced from the first pendulum so that the simulated pendulum will be located, closer to the front plate than the first pendulum, at a distance appropriate to the configuration of the external, visible clock parts on the front plate.

Thus, the simulated pendulum may have a size, shape, and location independent of the size, shape and location of the first pendulum which is hidden from view, but the simulated pendulum has the same angular oscillation as the first pendulum.

In one embodiment of the present invention, a picture, including a pictorial representation of a pendulum clock, is displayed on the front plate; and the simulated pendulum has a size, shape and location, relative to the clock front parts, appropriate for the pictured pendulum clock.

Other features and advantages are inherent in the structures claimed and disclosed, or will become apparent to those skilled in the art from the following diagrammatic drawing and detailed description.

DESCRIPTION OF THE PREFERRED EMBODIMENT

Figure 1:
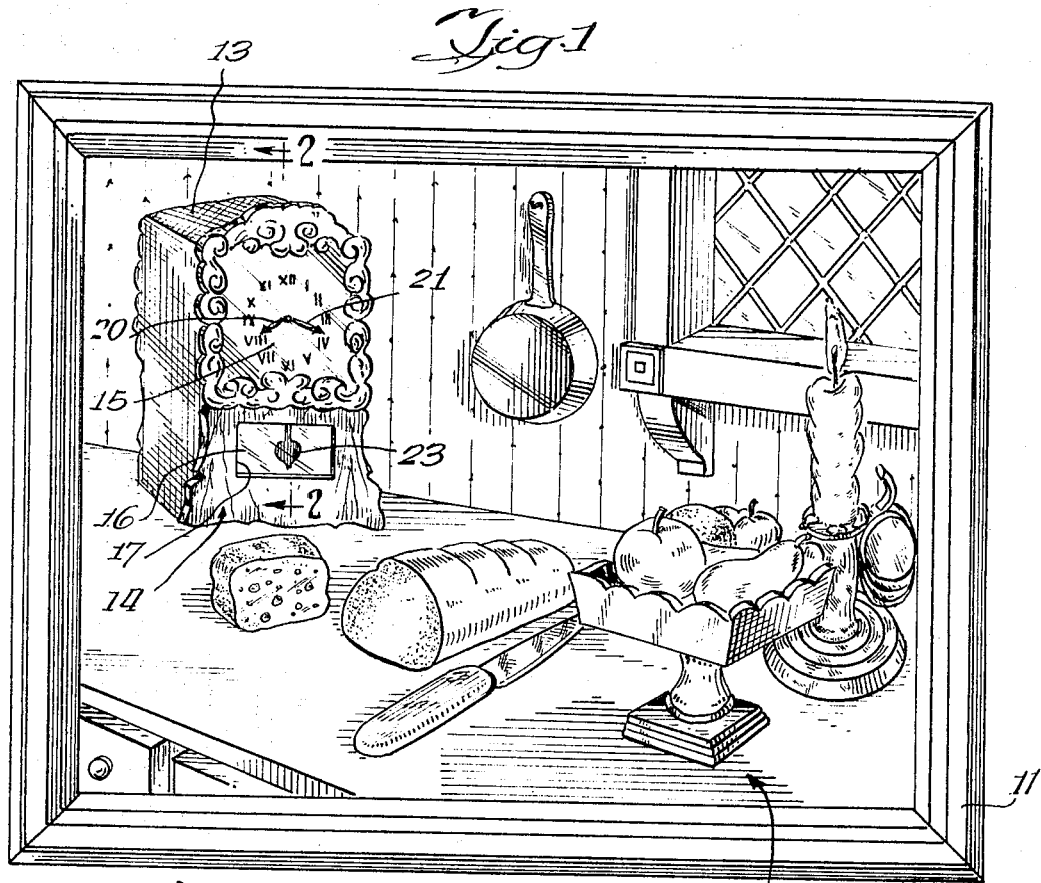
FIG. 1 is a front view of a pendulum clock constructed in accordance with an embodiment of the present invention, the pendulum clock being part of a larger picture.
Figure 2:
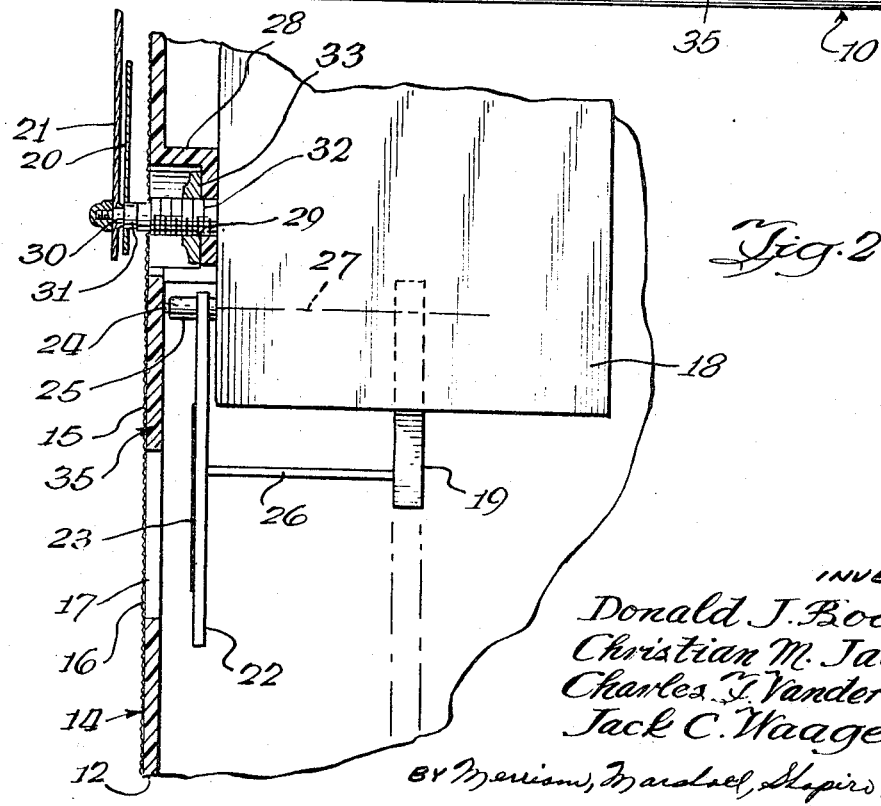
FIG. 2 is an enlarged, fragmentary, sectional view taken along the line 2—2 of FIG. 1.
Figure 3:
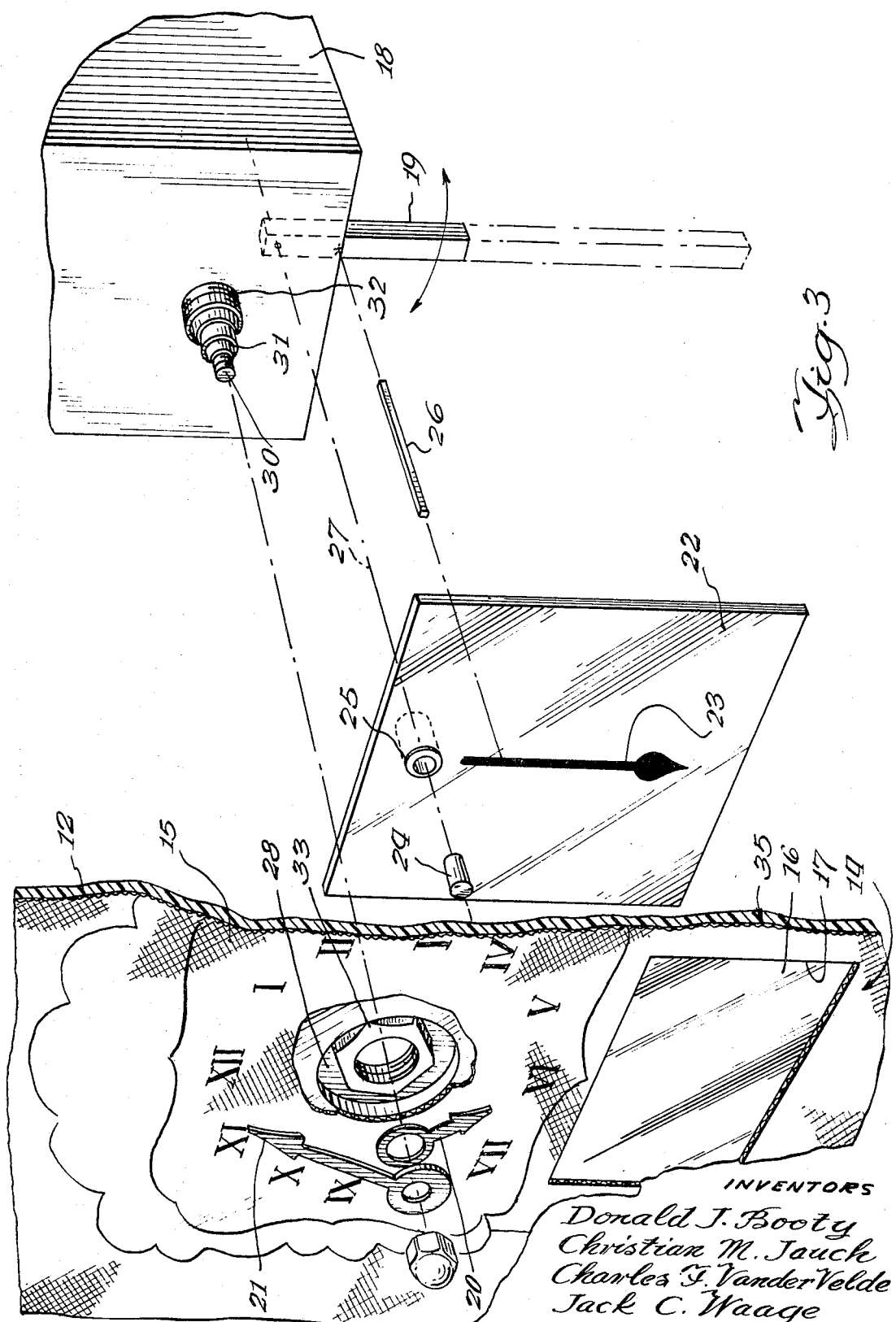
FIG. 3 is an enlarged, fragmentary, exploded perspective view of the pendulum clock of FIG. 1.

Referring to FIGS. 1, 2, and 3, there is shown a preferred embodiment of a pendulum clock constructed in accordance with the present invention. Indicated generally at 10 is a picture having a frame 11 surrounding a front plate 12 on the front surface of which is a pictorial representation 35 including a table supporting several objects including a pendulum clock 13.

The pictured pendulum clock 13 has a clock case front portion, indicated generally at 14, coplanar with front plate 12. Clock case front portion 14 has external, visible parts, such as a clock face 15 and a pendulum viewing window 16 corresponding to transparent opening 17 in front plate 12.

A clock mechanism 18, having a first pendulum 19, is mounted behind front plate 12 and drives clock hands 20, 21, located in front of clock face 15. Clock hands 20, 21 cooperate with clock face 15 to indicate the time of day. Clock mechanism 18 may be any conventional type, and first pendulum 19 may be either regulating or nonregulating.

Front plate 12 has an offset portion 28 with an opening 29 concentric with the axes of shafts 30, 31 which drive clock hands 20, 21 respectively. Clock mechanisms 18 has an externally threaded shank 32 coaxial with shafts 30, 31, but not rotatable therewith. Threadedly engaged around shank 32 is a nut 33 located in the offset portion 28 of front plate 12. Offset portion 28, shank 32 and nut 33 cooperate to mount clock movement 18 behind front plate 12.

Front plate 12 is of a size sufficient to hide from view all of pendulum 19 except that part located directly behind transparent opening 17. However, between the transparent opening and the first pendulum is an opaque plate 22 having a size sufficient to hide from view the rest of first pendulum 19.

A simulated pendulum 23 is displayed upon opaque plate 22 so as to be visible through transparent opening 17. The simulated pendulum may be displayed on the opaque plate by painting, embossing, soldering brazing, or otherwise attaching it. Simulated pendulum 23 is of a size and shape appropriate to the external, visible parts of the pictured pendulum clock 13, such as clock hands 20, 21, clock face 15 and other parts of clock case front portion 14. The simulated pendulum has a size and shape independent of the size and shape of the first pendulum.

The opaque plate and the simulated pendulum displayed thereon are mounted for movement with first pendulum 19 by structure shown in FIGS. 2 and 3. A pin 24 is attached to the rear of front plate 12 or to the front of clock mechanism 18 along the pivotal axis 27 of first pendulum 19; and a bushing 25, attached to opaque plate 22, is rotatably engaged on pin 24, so that opaque plate 22 is suspended from, and may pivot about, pin 24. Bushing 25 is located substantially along the projected length of simulated pendulum 23 so that, when opaque plate 22 is pivoted about the axis of pin 24, simulated pendulum 23 will appear radial to the arc described.

Opaque plate 22 is attached to first pendulum 19 by a member or strut 26, and this attachment imparts to opaque plate 22 an angular oscillation corresponding to the angular oscillation of first pendulum 19. Strut 24 has a length which spaces simulated pendulum 23 behind the transparent opening 17 a distance appropriate to the size of the external, visible parts of the pictured pendulum clock 13. The location of the simulated pendulum 23 behind front plate 12 is thus independent of the location of first pendulum 19.

If pin 24 and bushing 25 were omitted, and because of the spacing of opaque plate 22 from first pendulum 19, the weight of opaque plate 22 would urge first pendulum 19 arcuately in a rearward direction (to the right as viewed in FIG. 2), and thus disturb the vertical alignment of first pendulum 19. Through the use of pin 24 and bushing 25, the weight of opaque plate 22 is independently supported and will not effect the vertical alignment of first pendulum 19. Pin 24, bushing 25 and strut 26 may be omitted in other embodiments where opaque plate 22 is not spaced a distance from, but is attached directly to, and lies in the same plane as, first pendulum 19.

The foregoing detailed description has been given for clearness of understanding only, and no unnecessary limitations should be understood therefrom, as modifications will be obvious to those skilled in the art.

What is claimed is:

1. A pendulum clock comprising:
   a front plate having a transparent opening therein;
   a clock mechanism located behind said front plate and having a first pendulum;
   an opaque plate;
   means attaching said opaque plate to said first pendulum and mounting said opaque plate between the transparent opening in the front plate and the first pendulum, said opaque plate having a portion visible through said transparent opening in the front plate;
   and a simulated pendulum displayed on said visible portion of said opaque plate;
   the totality of said simulated pendulum being located behind said front plate.

2. In a pendulum clock as recited in claim 1, wherein:
   a part of said first pendulum is located behind said transparent opening in the front plate;
   and said opaque plate has a size sufficient to hide from view that part of said first pendulum located behind said transparent opening.

3. In a pendulum clock as recited in claim 2, said front plate having a size sufficient to hide from view all of said first pendulum not hidden by the opaque plate.

4. A pendulum clock comprising:
   a front plate having a transparent opening therein;
   a clock mechanism located behind said front plate and having a first pendulum;
   an apaque plate;
   means attaching said opaque plate to said first pendulum and mounting said opaque plate between the transparent opening in the front plate and the first pendulum, said opaque plate having a portion visible through said transparent opening in the front plate;
   said attaching means comprising means mounting said opaque plate for pivotal movement about the pivotal axis of said first pendulum;
   said attaching means further comprising means, securnig said opaque plate to said first pendulum at a distance from said first pendulum, for imparting to said opaque plate an annular oscillation corresponding to the angular oscillation of said first pendulum; and
   a simulated pendulum displayed on said visible portion of said opaque plate.

5. In a pendulum clock as recited in claim 4;
   a picture, including a pictorial representation of a pendulum clock, displayed upon the front surface of said front plate;
   said pictured pendulum clock having a pendulum window corresponding with said transparent opening in the front plate,
   said securing means comprising means for spacing said false pendulum a distance behind the transparent opening in the front plate appropriate for a pendulum clock of the size pictured.

6. In a pendulum clock as recited in claim 4 wherein said pivotal mounting means for the opaque plate comprises:
   a pin attached to the rear surface of said front plate at the intersection of the pivotal axis of said first pendulum and the front plate;
   and bushing means attached to said opaque plate;
   said bushing means comprising means mounting said opaque plate for pivotal movement about said pin.

7. In a pendulum clock as recited in claim 6, wherein said means securing said opaque plate to said first pendulum comprises a member having one end attached to said opaque plate and another end attached to said first pendulum.

8. A pendulum clock comprising:
   a front plate having a transparent opening therein;
   a clock mechanism located behind said front plate and having a first pendulum;
   an opaque plate;
   means attaching said opaque plate to said first pendulum and mounting said opaque plate between the transparent opening in the front plate and the first pendulum, said opaque plate having a portion visible through said transparent opening in the front plate;
   a simulated pendulum displayed on said visible portion of said opaque plate;
   and a picture, including a pictorial representation of a pendulum clock, displayed upon the front surface of said front plate;
   said pictured pendulum clock having a pendulum window corresponding with said transparent opening in the front plate;
   said simulated pendulum being of a size and shape appropriate to the external visible parts of said pictured pendulum clock and independent of the size and shape of said first pendulum.

9. In a pendulum clock as recited in claim 8, said assimulated pendulum being spaced a distance, behind the transparent opening in the front plate, appropriate for a pendulum clock of the size pictured.

10. A pendulum clock comprising:
    a front plate having a transparent opening therein;

a clock mechanism located behind said front plate and having a first pendulum;

an opaque plate;

means attaching said opaque plate to said first pendulum and mounting said opaque plate between the transparent opening in the front plate and the first pendulum, said opaque plate having a portion visible through said transparent opening in the front plate;

a simulated pendulum displayed on said visible portion of said opaque plate;

a picture, including a pictorial representation of a pendulum clock, displayed upon the front surface of said front plate;

said pictured pendulum clock having a pendulum window corresponding with said transparent opening in the front plate;

said simulated pendulum being spaced a distance, behind the transparent opening in the front plate, appropriate for a pendulum clock of the size pictured.

References Cited

UNITED STATES PATENTS 1,035,418  8/1912  Chouffet _____ 58—129X
3,419,989  1/1969  Booty _____ 58—127X STEPHEN J. TOMSKY, Primary Examiner E. C. SIMMONS, Assistant Examiner U.S. Cl. X.R.

58—2, 29, 123

PO-1050
(5/69)

UNITED STATES PATENT OFFICE
CERTIFICATE OF CORRECTION

Patent No. 3,546,874     Dated December 15, 1970

Inventor(s) Donald Booty et al.

It is certified that error appears in the above-identified patent and that said Letters Patent are hereby corrected as shown below:

Column 2, line 63, delete "mechanisms" and insert --mechanism

Column 3, line 6 , insert "," after the word soldering.

Column 3, line 64, delete "totalityof" and insert --totality

Column 4, line 5 , delete "apaque" and insert --opaque--.

Column 4, line 14, delete "securnig" and insert --securing--.
and 15

Column 4, line 17, delete "annular" and insert --angular--.

Column 4, line 71, delete "assimulated" and insert -simulated-

SIGNED AND
SEALED
MAR 9 1971

(SEAL)
Attest:

Edward M. Fletcher, Jr.
Attesting Officer

WILLIAM E. SCHUYLER, JR.
Commissioner of Patents